US007887666B2

(12) United States Patent
Nguyen

(10) Patent No.: US 7,887,666 B2
(45) Date of Patent: Feb. 15, 2011

(54) SINGULAR ID PROCESS AND PRODUCT

(75) Inventor: Joseph Nguyen, Onalaska, WI (US)

(73) Assignee: Northern Engraving Corporation, Sparta, WI (US)

( * ) Notice: Subject to any disclaimer, the term of this patent is extended or adjusted under 35 U.S.C. 154(b) by 373 days.

(21) Appl. No.: 12/013,016

(22) Filed: Jan. 11, 2008

(65) Prior Publication Data

US 2008/0171177 A1 Jul. 17, 2008

Related U.S. Application Data

(60) Provisional application No. 60/880,201, filed on Jan. 11, 2007.

(51) Int. Cl.
*B32B 37/02* (2006.01)

(52) U.S. Cl. ....................... 156/253; 156/256; 156/265; 156/152; 156/252

(58) Field of Classification Search ................. 156/256, 156/253, 265, 152, 252
See application file for complete search history.

(56) References Cited

U.S. PATENT DOCUMENTS

| | | | | |
|---|---|---|---|---|
| 3,574,026 | A * | 4/1971 | Kucheck | 156/152 |
| 4,599,253 | A * | 7/1986 | Bree | 428/40.9 |
| 5,599,416 | A * | 2/1997 | Kuwahara | 156/219 |
| 6,178,861 | B1 * | 1/2001 | Choy | 83/518 |
| 2002/0093688 | A1 | 7/2002 | Sieber et al. | |

FOREIGN PATENT DOCUMENTS

| | | |
|---|---|---|
| EP | 0 244 524 | 11/1987 |
| EP | 0 377 289 | 7/1990 |
| WO | WO 99/41074 | 8/1999 |

* cited by examiner

*Primary Examiner*—Linda L Gray
(74) *Attorney, Agent, or Firm*—McDonnell Boehnen Hulbert & Berghoff LLP

(57) ABSTRACT

A singular ID product including a decorative portion comprising one or more die cut pieces, each die cut piece having a first surface and a second surface, a mask layer covering the one or more die cut pieces, and an adhesive material located between and in contact with the mask layer and with the one or more die cut pieces as well as methods for manufacturing singular ID products.

14 Claims, 8 Drawing Sheets

SINGULAR ID PROCESS AND PRODUCT

This application claims priority to U.S. Provisional patent application No. 60/880201, filed on Jan. 11, 2007, the specification of which is incorporated herein by reference.

BACKGROUND OF THE INVENTION (1) Field of the Invention

This invention concerns methods for manufacturing Singular ID products as well as Singular ID products including a decorative article made from one or more separate die cut pieces wherein the die cut pieces that make up the Singular ID product can be simultaneously applied to a substrate surface.

(2) Discussion of the Prior Art

Labels and decorations including a plurality of separated design elements are highly desired due in part to their uniqueness. The manufacture of such labels and designs in a form that can be easily applied to a substrate surface is difficult and expensive. Therefore, methods for reproducibly and inexpensively manufacturing the labels and designs are needed.

SUMMARY OF THE INVENTION

One aspect of the invention are methods for manufacturing Singular ID products comprising the steps of: opening a die having a first half and a second half wherein the die first half includes a male punch and the die second half includes a female die complementary to the male punch; placing a sheet material having a first surface and a second surface between the die first half and the die second half; directing the male punch of the first die half against a surface of the sheet material and thereafter causing the die to form a die cut sheet material including a decorative portion and a scrap portion wherein the decorative portion becomes at least partially separated from the scrap portion of the sheet material to form voids in the scrap portion of the sheet material corresponding to the decorative portion; and directing the at least partially separated decorative portion of the sheet material back into the scrap material voids by moving the die first half away from the die second half to thereby form a die cut sheet material including an embedded decorative portion.

Other aspects of this invention are methods for manufacturing a Singular ID product comprising the steps of: opening a die having a first half and a second half wherein the die first half includes a male punch and the die second half includes a female die complementary to the male punch; placing an aluminum sheet material having a decorated first surface and a second surface between the die first half and the die second half; directing the male punch against a surface of the aluminum sheet material and thereafter causing the male punch to contact the female die to form a die cut aluminum sheet material including a decorative portion and a scrap portion wherein the decorative portion includes two or more die cut pieces that become at least partially separated from the scrap portion of the aluminum sheet material to form voids in the scrap portion of the sheet material corresponding to the shape of the two or more die cut pieces; directing the at least partially separated die cut pieces of the die cut aluminum sheet material back into the voids by moving the die first half away from the die second half to thereby form a die cut aluminum sheet material including an embedded decorative portion; applying a carrier including a mask layer and an adhesive layer to the decorated surface of the die cut aluminum sheet material including the embedded decorative portion such that the adhesive layer is located between the mask layer and the die cut aluminum sheet material decorated first surface; and separating the decorative portion of the die cut aluminum sheet material from the scrap portion of the die cut aluminum sheet material to form a Singular ID product including a decorative portion and a carrier.

Still other aspects of this invention are Singular ID products comprising: a decorative portion comprising one or more die cut pieces, each die cut piece having a first surface and a second surface; a mask layer covering the one or more die cut pieces; and an adhesive material located between and in contact with the mask layer and with the one or more die cut pieces.

DESCRIPTION OF SEVERAL CURRENT EMBODIMENTS

The present invention relates to methods and processes for manufacturing a Singular ID product and well as unique Singular ID products.

Figure 1A:
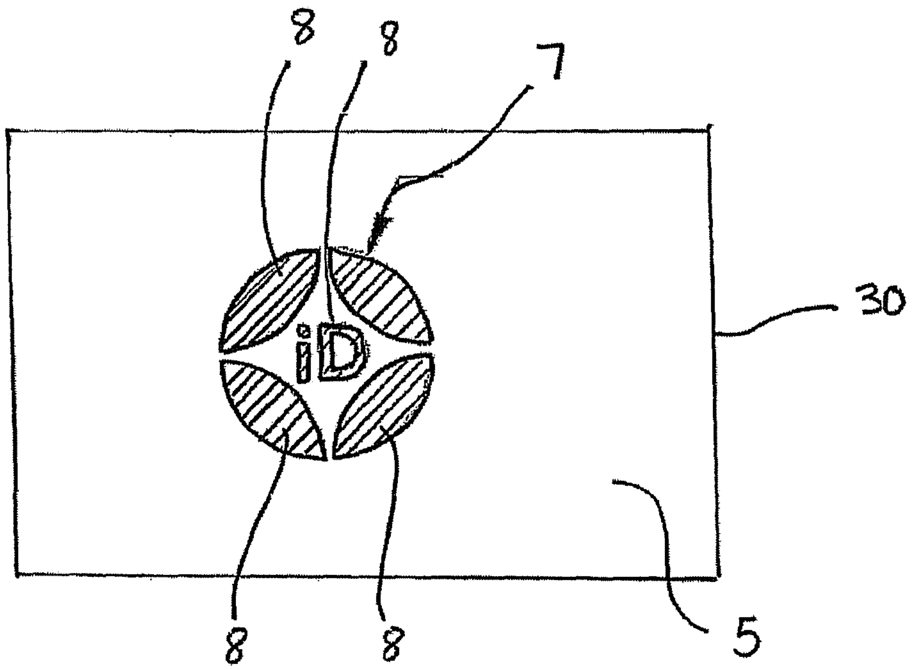
FIGS. 1A and 1B are top and side views of a Singular ID product embodiment of this invention.
Figure 1B:
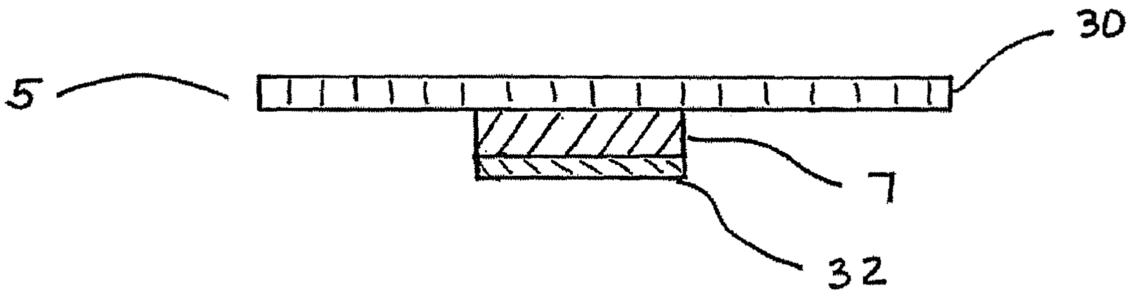

FIGS. 1A and 1B are overhead and side views respectively of a Singular ID product of the present invention. The Singular ID product 5 includes a decorative portion 7 including one or more die cut pieces 8. For decorative portion 7 shown in FIG. 1A, die cut pieces 8 include four individual oval shaped die cut pieces oriented in a circle with the individual die cut letters "iD" in the center of the circle formed by the oval shaped die cut pieces. In the Singular ID product embodiment shown in FIGS. 1A and 1B, die cut pieces 8 are each separate meaning that they do not touch. The Singular ID product 5 further includes a carrier 30 and an adhesive layer 32.

The Singular ID product 5 shown in FIGS. 1A and 1B is just one example of a Singular ID product configuration that can be sold and used by an end user who would apply and adhere decorative portion 7 to a substrate surface using adhesive layer 32. The Singular ID product invention embodiments will all typically share a decorative portion 7 including one or more die cut pieces 8. Carrier 30 including, for example paper sheet with a detachable adhesive on one side will be applied to decorative portion 7 to stabilize decorative portion 7 for shipping and so that it can be easily applied to a substrate surface.

Decorative portion 7 may include many optional layers such as carriers, mask layers, removable adhesive layers, permanent adhesive layers, adhesive layer liners, and so forth. The type of optional and additional layers used for a particular Singular ID product would be apparent to one skilled in the art depending upon the end application for the Singular ID product. For example, a Singular ID product that is applied to a computer housing might include a permanent adhesive layer on the undecorated side of decorative portion 7 that will bond the decorative portion to the computer housing and a carrier associated with the decorated side that is removed once decorative portion is attached to the computer housing. Alternatively, the decorative side of the decorative portion can include a permanent adhesive that is used to attached the decorative portion to a clear substrate such as glass. In this example, a carrier can be applied to the undecorated side on the decorative portion to stabilize the Singular ID product.

I. Starting Materials

Figure 2A:
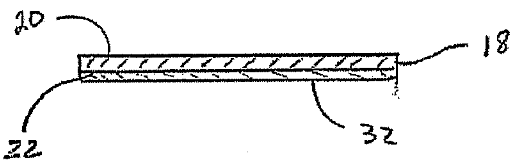
FIGS. 2A-2H are top and side views of a material sheet including an adhesive layer during the formation of a die cut sheet material.
Figure 2B:
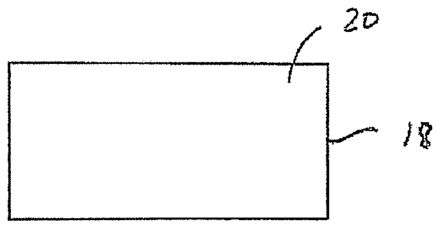

The methods and Singular ID products of this invention use or are fabricated from a sheet material 18, an example of which is shown in FIGS. 2A and 2B. Sheet material 18 may be any material that is stiff enough and resilient enough to be cut with a die. For example, sheet material 18 may be a metal sheet material such as aluminum, copper, brass, steel, alloys thereof and the like. Sheet material 18 may also be selected from plastic sheet materials such as, but not limited to, sheets made of MYLAR® (polyethylene terephalate) and polycarbonate materials.

Sheet material will have a first surface 20 that is used as the decorative face. The decorative face may be the natural color and or texture of the sheet material or a decorative material or surface texture may be applied to the first surface 20 of sheet material 18 to form a decorative surface. For example paint or a thin decorative sheet may be applied to first surface 20 of sheet material 18 before or during the Singular ID manufacturing process. Alternatively, metal sheet materials can include buffed surfaces, painted surfaces, partially painted surfaces and so forth. Polymer sheets may have similarly decorated first surfaces 20.

An optional adhesive layer 32 can be applied to the second surface 22 of sheet material 18—opposite the decorative surface—before sheet material 18 is processed in the methods discussed below. Adhesive layer 32 can be any type of adhesive, such as a pressure sensitive adhesive or a heat sensitive adhesive that is capable of forming a permanent or near permanent bond between decorative portion 7 and a substrate surface. The choice of adhesive type for adhesive layer 32 will generally depend upon how the singular ID product will be applied to a substrate. One useful type of adhesives are acrylic-based adhesives such as 467 or 468 acrylic transfer tape sold by The 3M Corporation, St. Paul Minn.

In another optional embodiment, adhesive layer 32 can be applied to the second, non-decorative surface 22 of sheet material 18 during or at the end of the Singular ID manufacturing process. An optional liner layer 34 can then be applied to protect adhesive layer 32. Liner layer 34 can optionally be applied to adhesive layer 32 before, during or following the manipulation of sheet material 18 in the manufacturing steps recited below. Examples of liner layers include paper, polymer coated or embedded paper, and polymer films such as polypropylene and polyester films.

Sheet material 18 may have any dimension or shape that can be processed in the manufacturing steps of this invention using the die(s) discussed below. For example sheet material 18 can be circular, square, and rectangular or it may have a shaped or irregular perimeter. It is anticipated that the larger sheets of sheet material 18 will have dimensions of from about 18"×18" to about 24"×24" or larger and on the small size of from about 1"×1" or smaller. The factor that most limits the sizes of sheet material 18 are the dies and other equipment used to manufacture Singular ID products of this invention. The sheet materials used in the Singular ID processes are generally but not exclusively, decorated trim components such as sheets of printed aluminum, MYLAR® (polyethylene terephalate), polycarbonate, brass, steel and so forth. The thickness of sheet materials 18 will generally range from about 0.003" to about 0.060" but they can be thicker or thinner depending upon the application. The adhesive layer that is used to bond a decorative portion to a substrate will generally have a thickness of from about 0.002" to about 0.060".

The sheet material may be pre-manufactured with registration holes 40 that are complementary to registration pins 42 in the dies used in the methods of the invention. Alternatively, registration holes 40 can be made in sheet material 18 during the processes of this invention or sheet materials 18 without registration holes can be processed in dies.

II. The Die Stations

The methods of this invention may use an optional preliminary die station followed by or preceded by a process die station.

A. Preliminary Die Station—A preliminary die station (not shown) may be used to cut sheet material 18 to a desired size and/or shape and to pierce out and apply registration hole(s) 40. The preliminary die station can also be used after the decorative portion 7 is formed in the process die in order to stabilize the sheet material that includes portion decorations 7 and scrap portions 26 while applying a protective mask and/or carrier to the die cut sheet material.

Figure 3:
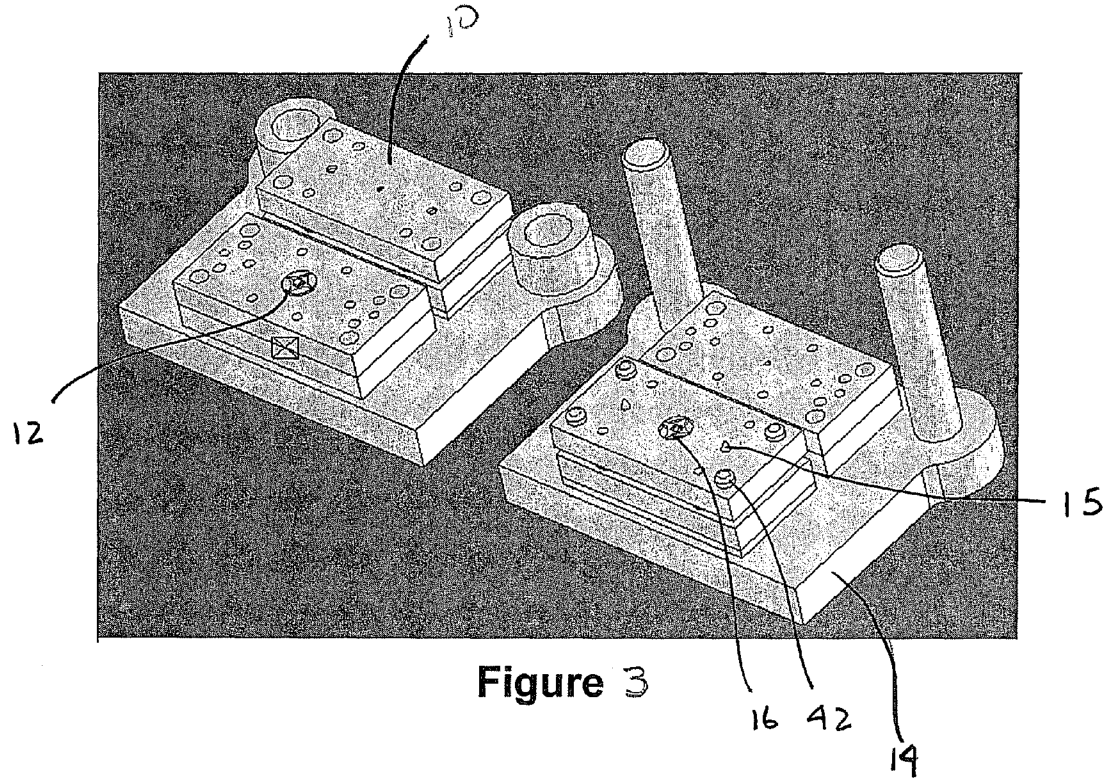
FIG. 3 is a perspective view of two die halves used in the preparation of Singular ID products.
Figure 4A:
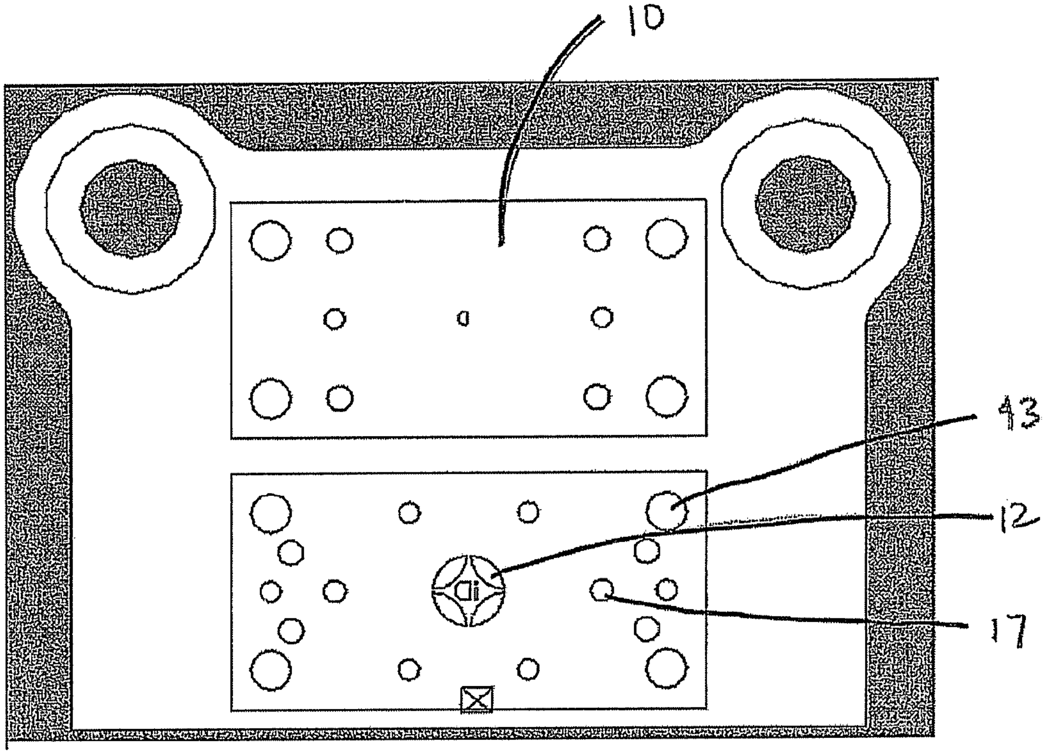
FIGS. 4A and 4B are top views of a first die half 12 and a second die half 16 used in the preparation of Singular ID products.
Figure 4B:
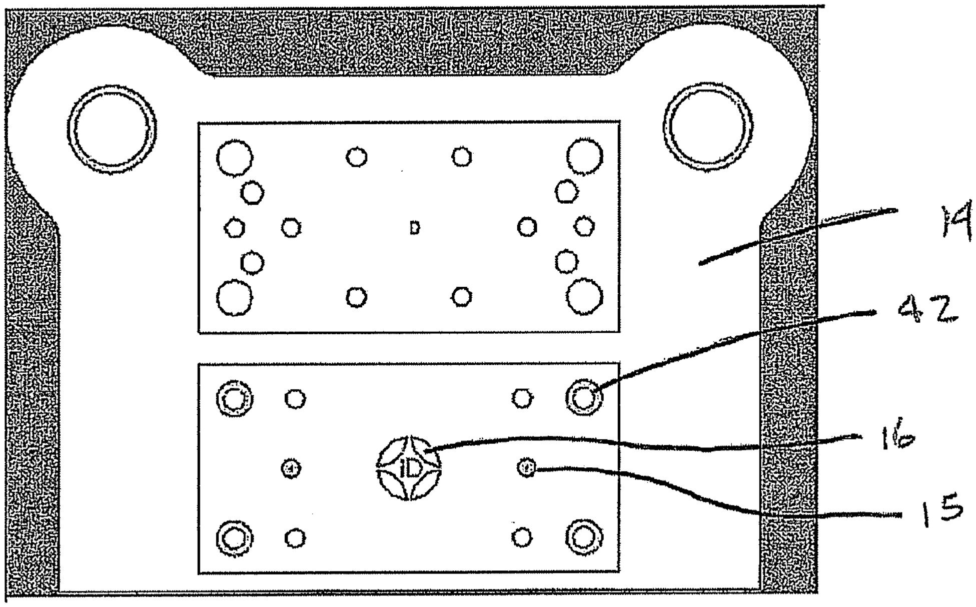

B. Process Die Station—FIG. 3 is a perspective view of a die first half 10 and a die second half 14 that together are useful in a process die station for manufacturing die cut sheet materials including an embedded decorative portion that can be finished to from Singular ID products of the present invention. FIGS. 4A and 4B are overhead views of process die stations including a die first half 10 and die second half 16 respectively. In the die embodiments shown in FIGS. 3 and 4A-4B, die first half 10 includes a male punch 12 that includes cutting edges that are capable of die cutting decorative portion 7 from sheet material 18. Die second half 14 includes a female die 14 that includes depression(s) 23 corresponding to each of the one or more decorative portion die cut pieces 8. Depression(s) 23 accept and momentarily retain the one or more die cut pieces 8 that are cut from sheet material 18 by the action of male punch 12. The die halves further includes optional registration pin(s) 42 and die guide(s) 15. In FIGS. 3 and 4A-4B, registration pins 42 are associated with dye second half 14 as are die guides 15. Also in the embodiment shown in FIGS. 3 and 4A-4B, die second half 14 remains stationary while die first half 10 moves towards and away from the stationary die second half 14. For this reason, registration pins 42 would preferably be located on die second half 14. However, the location of optional die guide(s) 15 and optional registration pin(s) 42 is not critical so they can be located on either die first half 10 or die second half 14 regardless of which if either die half is stationary.

If the dies include die guide(s) 15 and registration pin(s) 42, then corresponding die guide aperture(s) 17 and registration aperture(s) 43 will be located on the die half opposite the die half on which die guide(s) 15 and registration pin(s) 42 are placed. In operation, a material sheet 18 including registration holes 40 is associated with die second half 14 such that registration pins 42 pass through registration holes 40 in sheet material 18. When the two die halves are brought together, die guide(s) 15 and registration pin(s) 42 enter die guide aperture(s) 17 and registration aperture(s) 43 as the die halves approach one another. Die guide(s) 15 and registration pin(s) 42 thereby ensure that sheet material 18 and the two die halves remain in registration with one another during the die cutting step.

Figure 5:
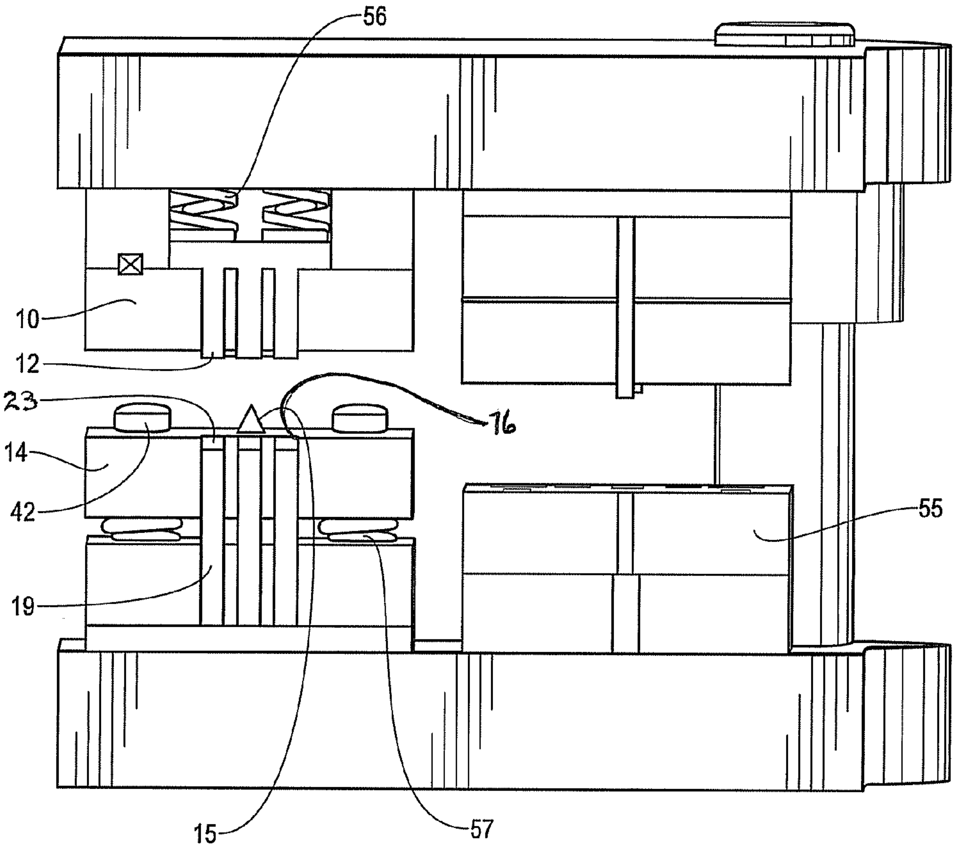
FIG. 5 is a side view of a die process station useful in the preparation of Singular ID products.

FIG. 5 is a side cut away view of an embodiment of a Singular ID process die station useful in manufacturing die cut sheet materials including an embedded decorative portion. Process die station 55 includes a die first half 10 having a male punch 12 along with a die second half 14 including a female die 16, registration pins 42 and die guides 15. Process die station 55 further includes a first spring 56 for urging male punch 12 towards sheet material 18. Die station 55 also includes a second spring 57 that urges a spring loaded knockout 19 towards depressions 23 formed in female die 16. In operation, male punch 12 cuts sheet material 18 to form one or more die cut pieces 8. Continued movement of male punch 12 towards female die 16 forces die cut pieces 8 into depressions 23 in female die 16. When die first half 10 moves away from die second half 14, the spring associated with spring loaded knockout 19 urges die cut pieces 8 back into registration with voids 21 formed in sheet material 18 during the die cutting procedure to form a die cut sheet material including a decorative portion having one or more die cut pieces.

There are several aspects of the die first half 10 and die second half 14 that can be optionally optimized in order to most efficiently manufacture Singular ID products. Die enter (the clearance between the male punch 12 and female die 16) should be kept to minimum. Generally dies are allowed to have a male to female clearance of about 10%. That specification is not acceptable in the present method because dies with such large clearances would produce a decoration portion that could not be returned to registration with the scrap portion of the sheet material. Therefore, dies of the present invention must have tighter clearances to be useful. The tolerated clearance will depend upon the sheet material thickness. Preferred die clearances are reported in Table 1 below.

TABLE 1

| Clearance between male punch & female die | | |
|---|---|---|
| Sheet Material Thickness | Die Clearance | Deviation |
| .003"-.025" | <.001" | |
| .025"-.030" | <.0015" | |
| .030"-.050" | <.002" | |
| .060" | .003" | ±0.0005 |

The Inside cavity of the female (bottom half should be clean to allow the die cut pieces travel back into the sheet material voids 21. A small taper can be added to die edges to ensure proper clearance between the male and female portions of the die.

Registration holes 40 can be applied to material sheet 18 as discussed above in a separate die cutting process. Alternatively, registration holes 40 can be applied to material sheet 18 using the processing die station discussed immediately above.

Figure 6A:
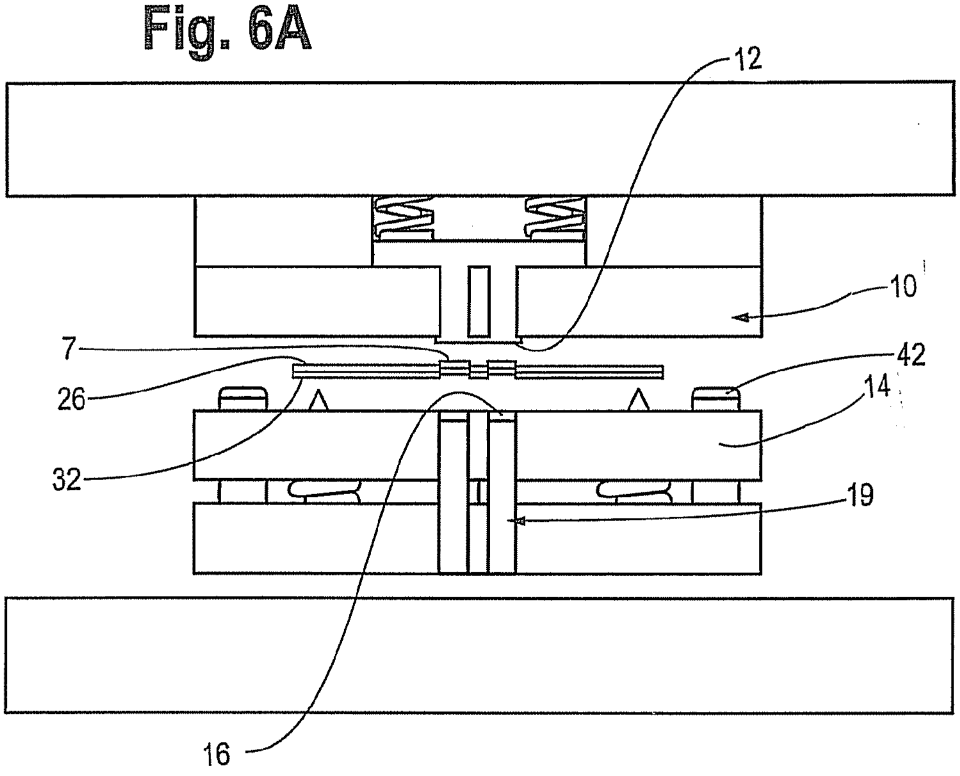
FIGS. 6A and 6B are side cutaway views of alternative embodiments of die process stations used in the preparation of Singular ID products.
Figure 6B:
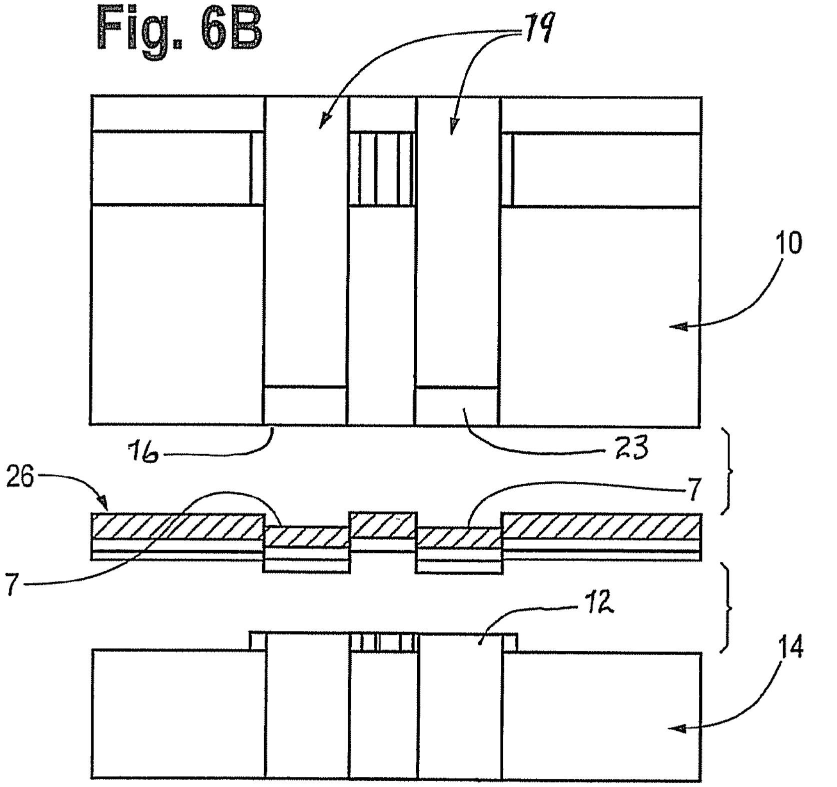

As noted above, the orientation of the die first half 10 and die second half 14 (which die halves move and which is located above the other) is not critical. FIG. 6A shows a process die station where die second half 14 includes a female die 16 and is located below the die first half 10 which includes a male punch 12. In FIG. 6B, the die first half 10 (the top most portion) includes a female die 16 while die second half 14 includes a male punch 12. In both embodiments shown in FIGS. 6A and 6B, the spring loaded knockouts 19 are associated with female die depressions 23. The primary difference between the Singular ID products produced by these different dies might be the orientation of the decorative portion with respect to the die cut material sheet after the decorative portion is returned to registration with the die cut material sheet. In FIG. 6A, the surface of decorative portion 7 lies slightly above the top surface of the remaining scrap portion 26 of the die cut material sheet. In FIG. 6B, the surface of decorative portion 7 lies slightly below the top surface of the remaining scrap portion 26 of the die cut material sheet.

The steps of manufacturing a die cut sheet material including an embedded decorative portion will be discussed with reference in particular to FIGS. 2A-2H and with reference generally to all of the application figures. The process die station 55 is useful for cutting a sheet material 18 that may or may not include an optional adhesive layer 32 associated either the decorated or undecorated surface. In FIGS. 2A-2H, the adhesive layer is associated with undecorated second surface 22 of sheet material 18. Sheet material 18 further includes a first surface 20 that is generally decorated.

Figure 2C:
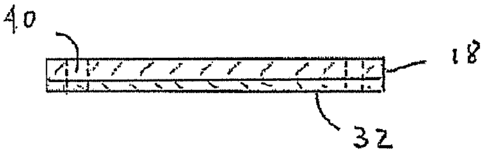
Figure 2D:
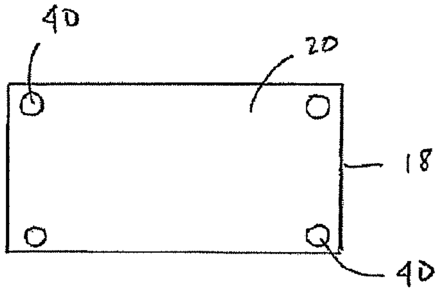

In FIGS. 2C-2D, registration holes 40 corresponding registration pins 42 on die second half 14 are applied to sheet material 18. Registration holes 40 pass through sheet material 18 and adhesive layer 32

Figure 2E:
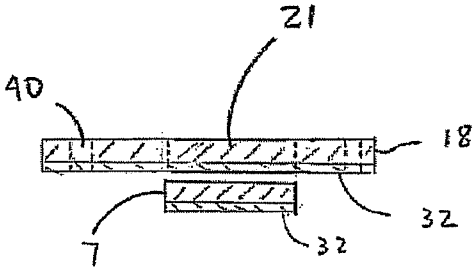
Figure 2F:
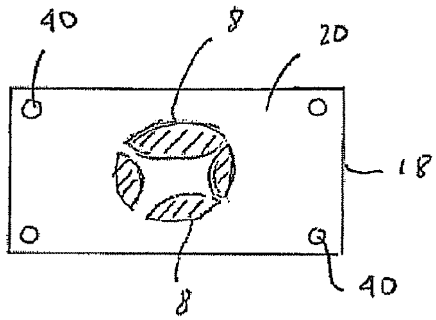
Figure 2G:
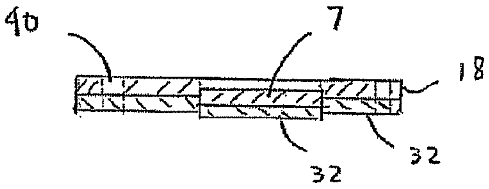
Figure 2H:
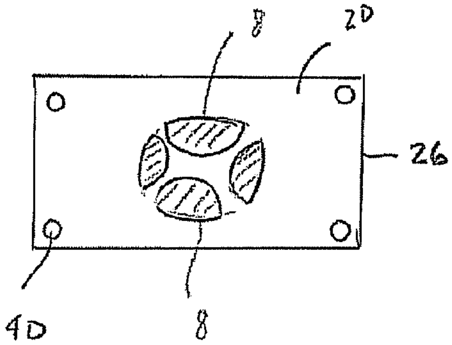

Referring now to FIGS. 2E-2F, sheet material 18 including registration holes 40 are located in process die station 55 such that registration holes 40 fit over registration pins 42. Die first half 10 is then moved towards die second half 14 to cause male punch 12 to punch out a desired decorative portion 7 from sheet material 18. As shown in FIGS. 2E-2F, decorative portion 7, comprising one or more die cut pieces 8 becomes at least partially separated from sheet material 18 during this process step. By "partially separated" it is meant that the one or more die cut pieces 8 become either fully separated from or at least become partially separated from (i.e. out of planar registration) the uncut or scrap portion 26 of material sheet 18 as shown in FIG. 2E. Next, die first half is moved away from die second half and spring loaded knockouts 19 cause die cut pieces 8 to fill voids 21 in scrap portion 26 corresponding to the one or more die cut pieces 8 as shown in FIGS. 2G-2H. In this manner, decorative portion 7 is stabilized by scrap portion 26 of original material sheet 18 to form a die cut material sheet including an embedded decorative portion 7—which is then rigid enough to be further processed to form a Singular Id product.

Figure 7A:
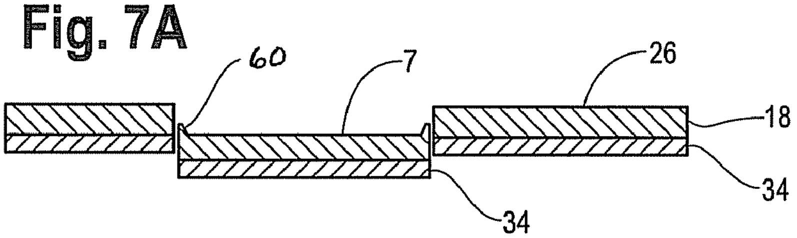
FIGS. 7A and 7B are side cutaway views of die cut material sheets of this invention including burrs.
Figure 7B:
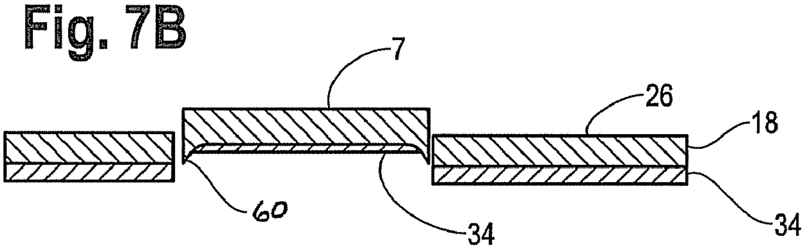
Figure 8A:
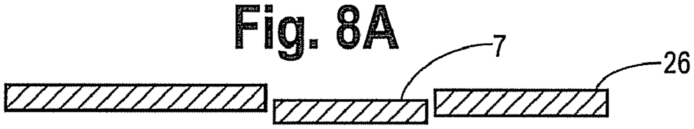
FIGS. 8A-8E are side cutaway views of optional steps for completing a Singular ID product from a die cut sheet material including an embedded decorative portion comprising one or more die cut pieces.
Figure 8B:
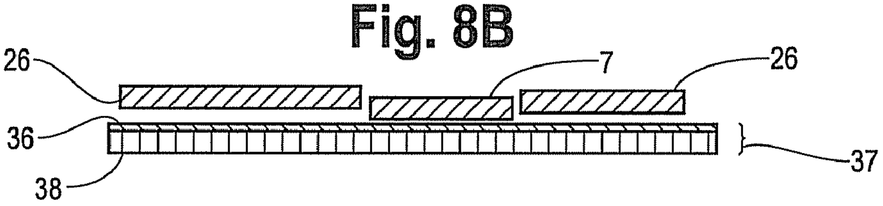
Figure 8C:
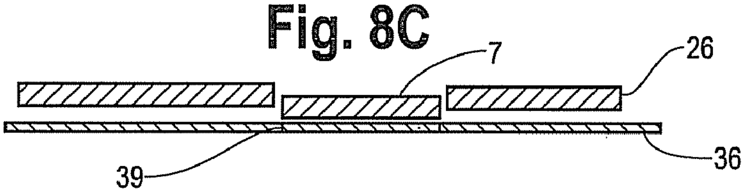
Figure 8D:
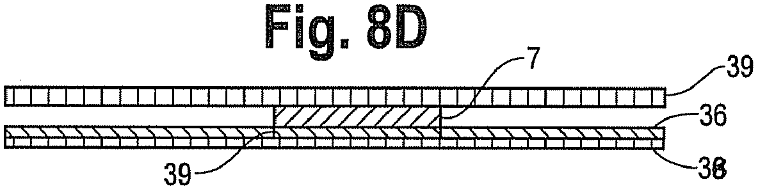
Figure 8E:
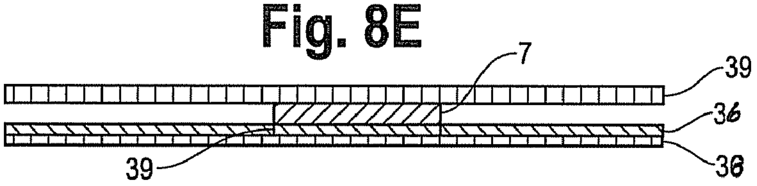

In a preferred embodiment, male punch 12 will cause burrs 60 to form on at least part to all of the perimeter of the one or more die cut pieces as shown in FIGS. 7A and 7B. Burrs 60 facilitate the registration of the least partially separated one or more die cut pieces 8 into scrap portion voids 21 where they are retained by scrap portion 26 of sheet material 18. It is not necessary for decorative portion 7 to return to full registration with scrap portion 26 of the die cut sheet material 18. Indeed, it is preferred that there is a slight planar deviation from full registration with at least one surface of decorative portion 7 lying slight below or slightly above the adjacent surface of scrap portion 26 of the die cut sheet material. This planar deviation from registration—which can range from about 0% to 75% of the thickness of the material sheet—simplifies the disengagement of decorative portion 7 from scrap portion 26 to form a singular ID product according to the subsequent processing steps below. It is preferred that the planar deviation range from about 15% to about 50% of the thickness of the sheet material. That is to say that the decorative portion will extend above or below the scrap material portion of the sheet material by a distance equivalent to 15% to 50% of the sheet material thickness.

Once the cut decorative portion 7 is back in near registration with the scrap portion of sheet material 18, the die cut sheet material can be further processed in the same process die station, it can be processed in the another die, or it can be further processed without associating it with a die to form a singular ID product. In one embodiment, shown in FIGS. 8A-8E, the die cut sheet material without an adhesive layer is further processed in the same die in which it was cut. In particular, a carrier 37 including a second adhesive layer 36 and a mask layer 38 is applied to undecorated side of the die cut sheet material. Mask layer 38 is removed from the adhesive, the die is closed and the die cut sheet material including an adhesive layer is cut so that the adhesive includes cuts 39 confirming to the shapes of the one or more die cut pieces 8. Next, mask layer 38 is reapplied to the adhesive layer while keeping the paper sheet flat. The die cut sheet material is then deformed to disengage decorative portion 7 including one or more die cut pieces 8 from the scrap material portion 26 after which the scrap material portion is discarded. The result of this finishing procedure is a singular ID product sheet including one or more die cut pieces 8 forming a decorative portion 7 including an adhesive layer located on the undecorated second surface 22 of each of the one or more die cut pieces 8 along with mask layer 38. A second adhesive backed mask 39 is applied to the first decorative surface of decorative portion 7 to form a singular ID product. This singular ID product embodiment is applied to a substrate by removing mask layer 38 associated with the adhesive on the die cut piece second surface, applying the decorative portion 7—adhesive layer down—to a substrate surface and then removing protective second mask 39 to expose decorative portion decorated surface.

Figure 9A:
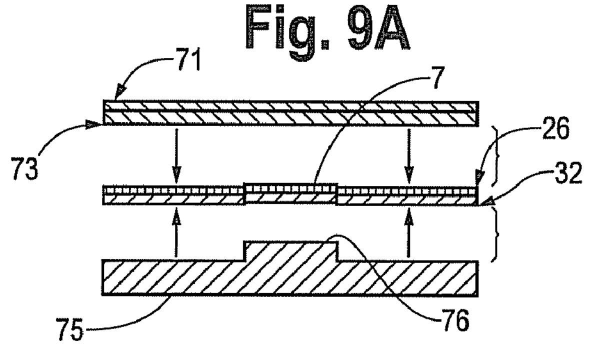
FIGS. 9A-9C are side cutaway views of optional steps for completing a Singular ID product from a die cut sheet material including an embedded decorative portion comprising one or more die cut pieces.
Figure 9B:
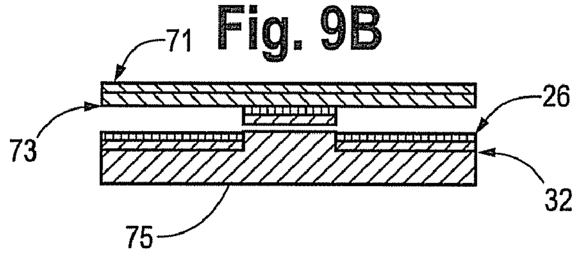
Figure 9C:
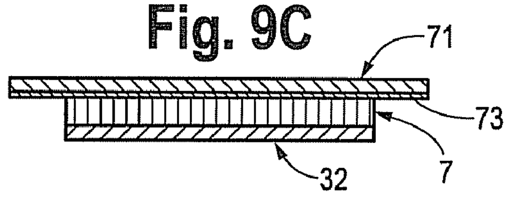

In a second finishing embodiment shown in FIGS. 9A-9C, a mask 71 including a removable adhesive layer 73 is applied to the first decorative surface 20 of the die cut sheet material. In this embodiment, the die cut sheet material will include a second nonremovable adhesive layer 32. After mask 71 is applied to the die cut sheet material, the decorative portion 7 is separated from scrap portion 26 to form a singular ID product shown in FIG. 9C. A pre-made fixture 75 including a plateau 76 corresponding in shape to decorative portion 7 can be used to separate the two portions. The singular ID product shown in FIG. 9C includes a mask 71 including a removable adhesive layer 73 associated with the first decorative surface 20 of decorative portion 7. An adhesive layer 32 is associated with second surface 32 of decorative portion 7. This singular ID product is applied to a substrate by bonding adhesive layer 32—which will typically be a pressure sensitive or thermal sensitive adhesive—to a substrate surface and thereafter removing mask 71 and removable adhesive layer 73 one piece from the first decorative surface 20 of decorative portion 7.

Figure 10A:
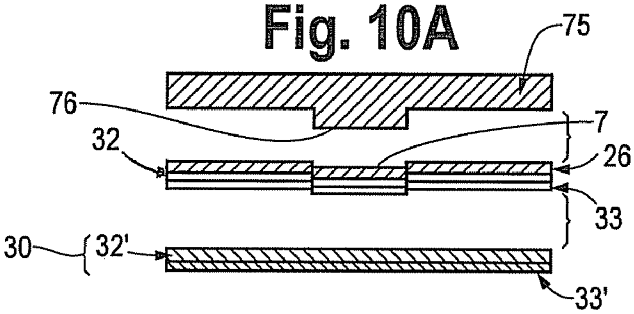
FIGS. 10A-10C are side cutaway views of optional steps for completing a Singular ID product from a die cut sheet material including an embedded decorative portion comprising one or more die cut pieces
Figure 10B:
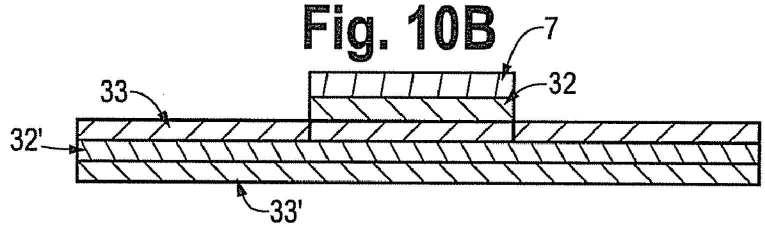
Figure 10C:
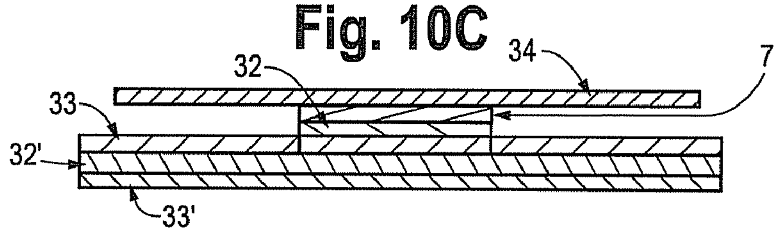
Figure 2A:
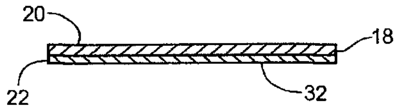
Figure 2B:
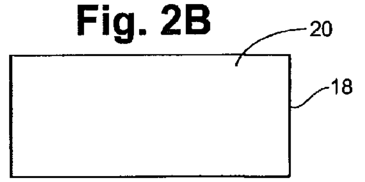
Figure 2C:
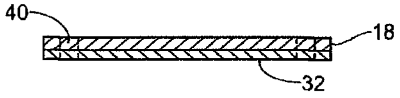
Figure 2D:
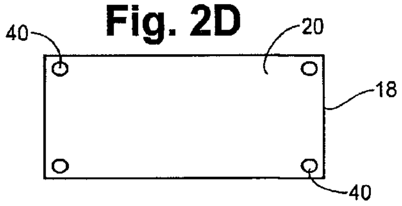
Figure 2E:
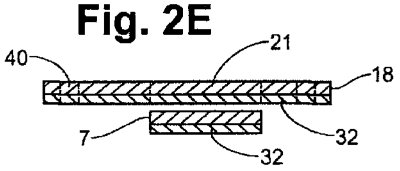
Figure 2F:
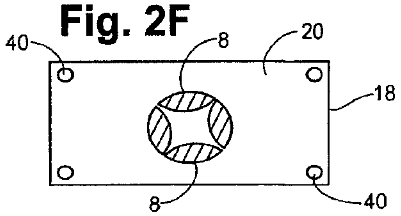
Figure 2G:
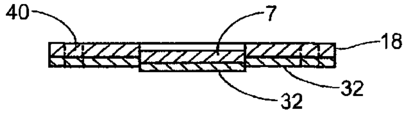
Figure 2H:
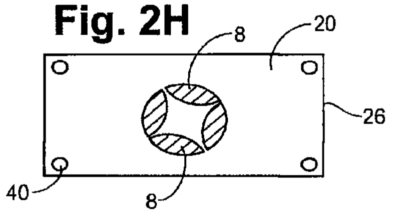
Figure 3:
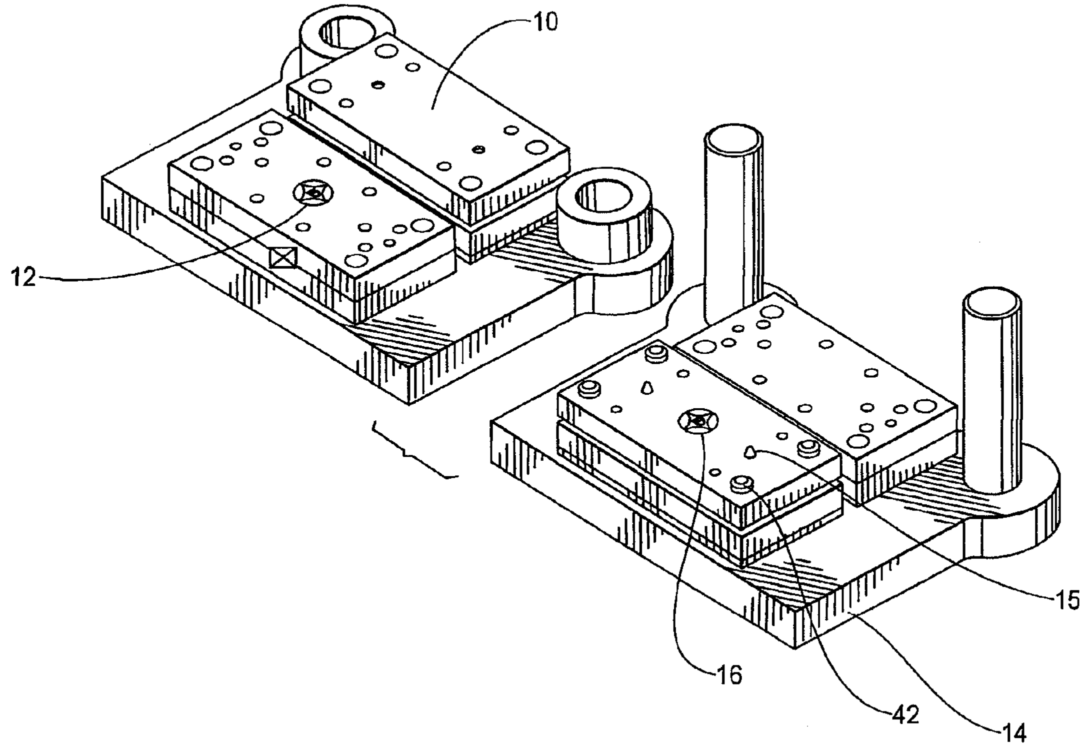
Figure 4A:
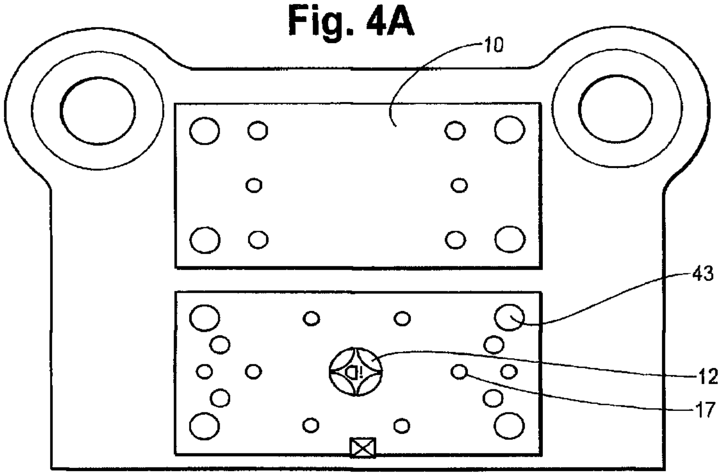
Figure 4B:
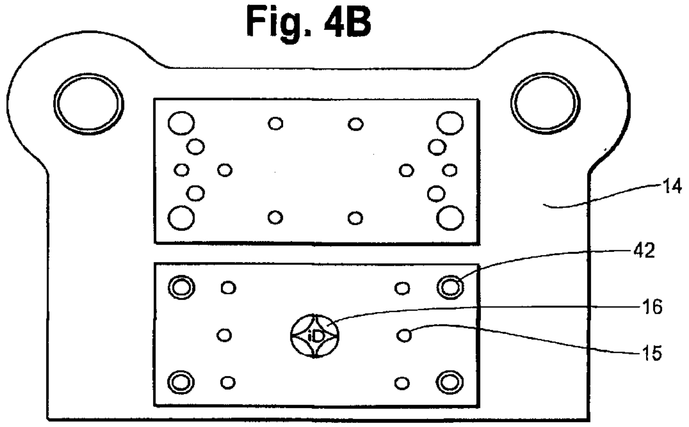

Still another finishing embodiment is shown in FIGS. 10A-10C. In FIG. 10A is shown a die cut material sheet including a decorative portion 7 and a scrap portion 26 that includes a pressure sensitive adhesive layer 32 covered by a liner layer 33. A carrier 30 including a second adhesive layer 32' and a second liner layer 33' is applied to the first liner and decorative portion 7 is separated from scrap portion 26 in FIG. 10B. Finally, in FIG. 10C, a mask layer 34 is adhesively applied to the exposed decorative portion surface to form a Singular ID product.

The general steps for manufacturing a singular ID product are summarized again below.

Start with a sheet material (aluminum preferred). The metal sheet may be decorated on one surface mechanically or with a painted or otherwise decorated surface.

Apply registration holes and preferably a plurality of holes to the sheet material.

Cut the metal sheet including multiple registration holes into strips, each strip including registration holes. The strips may be as large at 18 inches×18 inches or lager and they may be as small as 1 inch×1 inch or smaller. The strip size is limited only by the size of strip that can be manipulated by the processing equipment.

Prepare a die having a first half and a complementary second half. One of the halves will include registration pins complementary to the registration holes in the cut metal sheets. Moreover, one die half will include a male portion and the complementary half will have a female portion.

Bring the two ends of the die together to cut and separation portions of the sheet material (design) from the remainder of the sheet material (scrap).

Move the two die ends apart and direct the cut portion of the sheet materials back into registration with the scrap portion.

While in the same die, apply a carrier including an adhesive and a mask to the non decorated side of the sheet material—remove the mask from the adhesive, close the same die to cut the adhesive in the shape of the cutouts. Reapply to the mask paper to the adhesive on the surface of the sheet material, and, while keeping the paper sheet planar, bend the sheet material slightly and disengage the scrap sheet material from the paper mask.

The result is one or more sheet material cut outs including an adhesive layer of the surface opposite the decorative surface. A second mask layer can be adhesively applied to the decorative surface of the cut outs once the cut outs are disengaged from the scrap sheet material.

The decorative cut outs are applied by removing the mask covering the adhesive associated with the non-decorative surface of the cut outs and applying the cut outs to a surface. Next the mask covering the cut-outs is removed along with the adhesive to expose the decorative surface.

The mask layer or liner layers, if used, should have strong enough adhesive to hold the die cut pieces in place. Also, after application of the Singular ID product to a substrate, it is preferred if no adhesive residue remains on the decorative face. In order to apply the product as a decoration to a surface, the mask or liner covering the adhesive is removed and the wet adhesive surface of the decorative item is applied to the surface being decorated.

The mask layer and/or liner layers protect the decorative face of the product during shipment, storage and application to a surface. The pressure or temperature sensitive adhesive layer is exposed and the exposed adhesive layer is applied to a surface with pressure or heating. Once applied to the surface, the mask and the adhesive material holding the mask onto the decorative surface of the product is removed in order to expose the decorative surface.

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for manufacturing a singular ID product comprising the steps of:

a) opening a die having a first half and a second half wherein the die first half includes a male punch and the die second half includes a female die complementary to the male punch;

b) placing a sheet material having a first surface and a second surface between the die first half and the die second half;

c) directing the male punch of the first die half against a surface of the sheet material and thereafter causing the die to form a die cut sheet material including a decorative portion and a scrap portion wherein the decorative portion becomes at least partially separated from the scrap portion of the sheet material to form voids in the scrap portion of the sheet material corresponding to the decorative portion; and d) directing the at least partially separated decorative portion of the sheet material back into the scrap material voids by moving the die first half away from the die second half to thereby form a die cut sheet material including an embedded decorative portion wherein the method includes the further steps of:

i. applying a carrier including an adhesive layer and a mask layer to one of the first surface or the second surface of the sheet material either before directing step c or after directing step d;

ii. removing the mask layer if the carrier is applied to the sheet material before directing step c and cutting the sheet material by directing the die first half including the male punch through the adhesive layer and the sheet material and into the female die of the die second half to cut the adhesive layer in registration with the decorative portion;

applying a mask to the adhesive layer after directing step d to form a die cut sheet material having a mask covered surface and an exposed surface; and iii. separating the embedded decorative portion including the adhesive layer in registration with the decorative portion and the mask from the scrap portion to form a singular ID product having a decorative portion that includes two or more die cut decorative pieces that are separate from one another.

2. The method of claim 1 wherein the sheet material first surface is a decorated surface.

3. The method of claim 2 wherein the carrier is applied to the second surface.

4. The method of claim 1 wherein the decorative portion, the cut portion of the adhesive in registration with the decorative portion and the mask are disengaged from the scrap portion to form the singular ID product.

5. The method of claim 4 wherein the disengagement is accomplished by slightly deforming the die cut sheet material.

6. The method of claim 4 wherein a second mask is adhered to the exposed surface of the singular ID product.

7. The method of claim 1 wherein the sheet material is a material selected from a metal, a plastic, or wood.

8. The method of claim 1 wherein the sheet material is an aluminum sheet having a decorated first surface.

9. The method of claim 1 wherein the sheet material includes one or more registration holes that are complementary to one or more registration pins located on a die half selected from the group consisting of the first die half and the second die half.

10. The method of claim 1 wherein one surface of the sheet material includes an adhesive layer.

11. A method for manufacturing a singular ID product comprising the steps of:

opening a die having a first half and a second half wherein the die first half includes a male punch and the die second half includes a female die complementary to the male punch;

placing a sheet material having a first surface and a second surface between the die first half and the die second half;

directing the male punch of the first die half against a surface of the sheet material and thereafter causing the die to form a die cut sheet material including a decorative portion and a scrap portion wherein the decorative portion becomes at least partially separated from the scrap portion of the sheet material to form voids in the scrap portion of the sheet material corresponding to the decorative portion; and directing the at least partially separated decorative portion of the sheet material back into the scrap material voids by moving the die first half away from the die second half to thereby form a die cut sheet material including an embedded decorative portion the method further including applying a carrier including a mask layer and an adhesive layer to the die cut sheet material including an embedded decorative portion such that the adhesive layer is located between the mask layer and the sheet material and thereafter separating the decorative portion of the die cut sheet material from the scrap portion of the die cut sheet material to form a singular ID product including a decorative portion having a top surface and a bottom surface, a mask layer and an adhesive layer located between the decorative portion top surface and the mask layer.

12. The method of claim 11 wherein the singular ID product includes an adhesive layer applied to the decorative portion bottom surface.

13. A method for manufacturing a singular ID product comprising the steps of:

opening a die having a first half and a second half wherein the die first half includes a male punch and the die second half includes a female die complementary to the male punch;

placing an aluminum sheet material having a decorated first surface and a second surface between the die first half and the die second half;

directing the male punch against a surface of the aluminum sheet material and thereafter causing the male punch to contact the female die to form a die cut aluminum sheet material including a decorative portion and a scrap portion wherein the decorative portion includes two or more die cut pieces that become at least partially separated from the scrap portion of the aluminum sheet material to form voids in the scrap portion of the sheet material corresponding to the shape of the two or more die cut pieces;

directing the at least partially separated die cut pieces of the die cut aluminum sheet material back into the voids by moving the die first half away from the die second half to thereby form a die cut aluminum sheet material including an embedded decorative portion;

applying a carrier including a mask layer and an adhesive layer to the decorated surface of the die cut aluminum sheet material including the embedded decorative portion such that the adhesive layer is located between the mask layer and the die cut aluminum sheet material decorated first surface; and separating the decorative portion of the die cut aluminum sheet material from the scrap portion of the die cut aluminum sheet material to form a singular ID product including a decorative portion and a carrier.

14. The method of claim 11 wherein the sheet material second surface includes a dry adhesive layer.

* * * * *

UNITED STATES PATENT AND TRADEMARK OFFICE

CERTIFICATE OF CORRECTION

PATENT NO. : 7,887,666 B2
APPLICATION NO. : 12/013016
DATED : February 15, 2011
INVENTOR(S) : Joseph Nguyen It is certified that error appears in the above-identified patent and that said Letters Patent is hereby corrected as shown below:

In the drawings, Fig. 1A and 1B should be replaced with the corrected Figs. 1A and 1B as shown below.

Fig. 1A

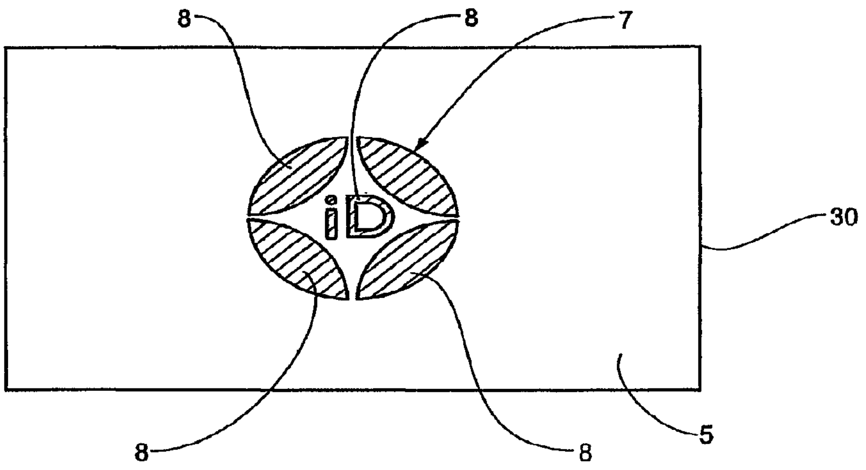

Fig. 1B

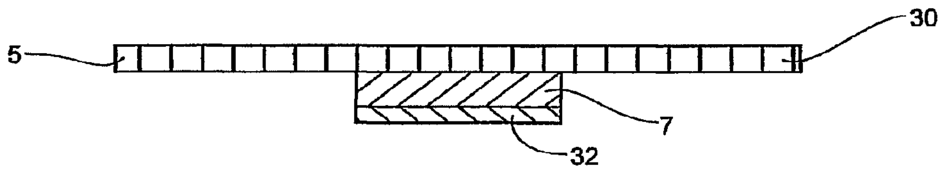

Signed and Sealed this
Third Day of July, 2012

David J. Kappos
*Director of the United States Patent and Trademark Office*

In the drawings, Figs. 2A, 2B, 2C, 2D, 2E, 2F, 2G, and 2H should be replaced with the corrected Figs. 2A, 2B, 2C, 2D, 2E, 2F, 2G, and 2H as shown below.

In the drawing, Fig. 3 should be replaced with the corrected Fig. 3 as shown below.

In the drawings, Figs. 4A and 4B should be replaced with the corrected Figs. 4A and 4B as shown below.